(12) United States Patent
Hyde et al.

(10) Patent No.: US 9,303,499 B2
(45) Date of Patent: Apr. 5, 2016

(54) SYSTEMS AND METHODS FOR ENHANCING RECOVERY OF HYDROCARBON DEPOSITS

(71) Applicant: Elwha LLC, Bellevue, WA (US)

(72) Inventors: Roderick A. Hyde, Redmond, WA (US); Nathan P. Myhrvold, Bellevue, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 527 days.

(21) Appl. No.: 13/655,115

(22) Filed: Oct. 18, 2012

(65) Prior Publication Data

US 2014/0110103 A1    Apr. 24, 2014

(51) Int. Cl.

| E21B 36/04 | (2006.01) |
|---|---|
| G01V 3/30 | (2006.01) |
| E21B 43/24 | (2006.01) |
| E21B 47/10 | (2012.01) |
| E21B 43/243 | (2006.01) |

(52) U.S. Cl.
CPC ........... *E21B 43/2401* (2013.01); *E21B 47/102* (2013.01); *E21B 43/24* (2013.01); *E21B 43/243* (2013.01)

(58) Field of Classification Search
CPC ....... E21B 43/2401; E21B 36/04; G01V 3/30; A61B 5/0507
See application file for complete search history.

(56) References Cited

U.S. PATENT DOCUMENTS

| 2,757,738 A | 8/1956 | Ritchey |
|---|---|---|
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,193,448 A | 3/1980 | Jeambey |
| 4,193,451 A | 3/1980 | Dauphine |
| 4,196,329 A | 4/1980 | Rowland et al. |
| 4,301,865 A | 11/1981 | Kasevich et al. |
| 4,320,801 A | 3/1982 | Rowland et al. |
| 4,456,065 A | 6/1984 | Heim et al. |
| 4,457,365 A | 7/1984 | Kasevich et al. |
| 4,458,945 A | 7/1984 | Ayler et al. |
| 4,485,869 A | 12/1984 | Sresty et al. |
| 4,487,257 A | 12/1984 | Dauphine |
| 4,508,168 A | 4/1985 | Heeren |
| 4,524,826 A | 6/1985 | Savage |

(Continued)

OTHER PUBLICATIONS

PCT International Search Report; International App. No. PCT/US2013/065383; Jan. 24, 2014; pp. 1-5.

*Primary Examiner* — Blake Michener
*Assistant Examiner* — Kipp Wallace
(74) *Attorney, Agent, or Firm* — Foley & Lardner LLP (57) ABSTRACT

A method for enhancing the recovery of hydrocarbon deposit includes the step of sensing a material property of an underground volume. A three-dimensional map identifying the spatial variation in the sensed material property of the underground volume is generated. Propagating electromagnetic radiation is transmitted in the volume based on the map. The propagating electromagnetic radiation transmission is varied in at least one of frequency, polarization, wavelength, frequency, amplitude, mode, and phase in response to the variation in the material property of a region within the volume to which the propagating electromagnetic radiation is directed. Accordingly, the volume is heated in a spatially varying manner to heat material in the volume and thereby induce the flow of hydrocarbon deposits from the volume.

41 Claims, 7 Drawing Sheets

(56) References Cited

U.S. PATENT DOCUMENTS

| | | | |
|---|---|---|---|
| 4,553,592 A | 11/1985 | Looney et al. | |
| 4,583,589 A | 4/1986 | Kasevich | |
| 4,660,636 A | 4/1987 | Rundell et al. | |
| 4,755,944 A | 7/1988 | Glass | |
| 4,817,711 A | 4/1989 | Jeambey | |
| 4,912,971 A | 4/1990 | Jeambey | |
| 5,065,819 A | 11/1991 | Kasevich | |
| 5,236,039 A | 8/1993 | Edelstein et al. | |
| 5,499,029 A | 3/1996 | Bashforth et al. | |
| 5,588,032 A | 12/1996 | Johnson et al. | |
| 5,892,362 A | 4/1999 | Warren et al. | |
| 5,892,732 A | 4/1999 | Gersztenkorn | |
| 6,005,916 A | 12/1999 | Johnson et al. | |
| 6,216,090 B1 | 4/2001 | Hagiwara | |
| 6,216,540 B1 | 4/2001 | Nelson et al. | |
| 6,937,190 B1 | 8/2005 | Jackson | |
| 7,091,460 B2 | 8/2006 | Kinzer | |
| 7,312,428 B2 | 12/2007 | Kinzer | |
| 7,397,417 B2 | 7/2008 | Jackson | |
| 7,424,911 B2 | 9/2008 | McCarthy et al. | |
| 7,441,597 B2 | 10/2008 | Kasevich | |
| 7,486,248 B2 | 2/2009 | Halek et al. | |
| 7,677,673 B2 * | 3/2010 | Tranquilla et al. | 299/2 |
| 7,684,846 B2 | 3/2010 | Johnson et al. | |
| 7,753,119 B2 | 7/2010 | Chen et al. | |
| 7,828,057 B2 | 11/2010 | Kearl et al. | |
| 7,841,982 B2 | 11/2010 | Johnson et al. | |
| 7,889,146 B2 | 2/2011 | Halek et al. | |
| 7,891,421 B2 | 2/2011 | Kasevich | |
| 7,921,907 B2 | 4/2011 | Burnham et al. | |
| 7,975,763 B2 | 7/2011 | Banerjee et al. | |
| 8,016,038 B2 | 9/2011 | Goodwin et al. | |
| 8,511,378 B2 * | 8/2013 | Parsche et al. | 166/248 |
| 2006/0039237 A1 | 2/2006 | Mori | |
| 2006/0052699 A1 | 3/2006 | Angelsen et al. | |
| 2006/0084859 A1 | 4/2006 | Johnson et al. | |
| 2006/0170424 A1 * | 8/2006 | Kasevich | 324/338 |
| 2006/0283598 A1 | 12/2006 | Kasevich | |
| 2006/0287596 A1 | 12/2006 | Johnson et al. | |
| 2006/0293597 A1 | 12/2006 | Johnson et al. | |
| 2007/0075890 A1 | 4/2007 | Jackson | |
| 2007/0108202 A1 | 5/2007 | Kinzer | |
| 2007/0137858 A1 | 6/2007 | Considine et al. | |
| 2007/0215613 A1 | 9/2007 | Kinzer | |
| 2007/0282200 A1 | 12/2007 | Johnson et al. | |
| 2007/0289736 A1 | 12/2007 | Kearl et al. | |
| 2008/0105425 A1 | 5/2008 | MacGregor et al. | |
| 2008/0110263 A1 * | 5/2008 | Klessel et al. | 73/602 |
| 2008/0265654 A1 | 10/2008 | Kearl et al. | |
| 2008/0314730 A1 | 12/2008 | Pringle | |
| 2009/0050318 A1 | 2/2009 | Kasevich | |
| 2009/0114384 A1 | 5/2009 | Considine et al. | |
| 2009/0146897 A1 | 6/2009 | Halek et al. | |
| 2009/0188665 A1 | 7/2009 | Tubel et al. | |
| 2009/0200016 A1 * | 8/2009 | Goodwin et al. | 166/248 |
| 2009/0242196 A1 | 10/2009 | Pao | |
| 2009/0250204 A1 | 10/2009 | Harris | |
| 2009/0272531 A1 | 11/2009 | Montaron | |
| 2009/0277630 A1 * | 11/2009 | McDaniel et al. | 166/250.1 |
| 2009/0299637 A1 | 12/2009 | Dasgupta | |
| 2010/0036244 A1 | 2/2010 | Angelsen et al. | |
| 2010/0065265 A1 | 3/2010 | Kasevich | |
| 2010/0071894 A1 * | 3/2010 | Benischek et al. | 166/248 |
| 2010/0078163 A1 | 4/2010 | Banerjee et al. | |
| 2010/0206557 A1 | 8/2010 | Davies | |
| 2010/0288497 A1 | 11/2010 | Burnham et al. | |
| 2010/0294488 A1 * | 11/2010 | Wheeler et al. | 166/248 |
| 2010/0307741 A1 * | 12/2010 | Mosse et al. | 166/250.01 |
| 2011/0174496 A1 | 7/2011 | Burnham et al. | |
| 2012/0056623 A1 * | 3/2012 | Esmersoy | 324/332 |
| 2012/0061383 A1 * | 3/2012 | Parsche | 219/635 |
| 2012/0234536 A1 * | 9/2012 | Wheeler et al. | 166/272.1 |
| 2013/0070562 A1 * | 3/2013 | Thompson et al. | 367/38 |

* cited by examiner

3-D MAP DATA STRUCTURE

| Material Prop. 1 | Material Prop. 2 | Coordinates | | |
|---|---|---|---|---|
| Temp (°C) | Density (kg/m$^3$) | x | y | z |
| 60 | 100 | 5 | 2 | -1 |
| 65 | 999 | 6 | 2 | -1 |
| 70 | 996 | 7 | 2 | -1 |
| 72 | 995.5 | 8 | 2 | -1 |
| . | . | . | . | . |
| . | . | . | . | . |
| . | . | . | . | . |
| . | . | . | . | . |
| . | . | . | . | . |
| . | . | . | . | . |
| . | . | . | . | . |

FIG. 5

SYSTEMS AND METHODS FOR ENHANCING RECOVERY OF HYDROCARBON DEPOSITS

BACKGROUND

Retrieving oil from an underground location presents a number of challenges. One of the challenges occurs when oil has been located, but the viscosity of the oil or the adhesion to the surrounding underground environment prevents the oil from flowing into an oil recovery unit or device. This is particularly challenging in certain areas or when recovering oil from certain regions, such as oil recovered from tar sands.

In order to increase the recovery of the oil from an underground location, heat may be locally injected in an unguided or blind manner into the underground location, for example, by burning the medium in which recovery is sought. Such modes of heating are particularly inefficient as they consume at least a part of the end-product attempting to be recovered and because energy is wasted as heat is injected into areas that might yield no increase while areas that may yield oil if heated remain unidentified.

SUMMARY

The inventors have appreciated that the recovery of hydrocarbons, such as oil may be enhanced through the implementation of inventive mapping and heating mechanisms and regimes. In view of the foregoing, the present disclosure is directed to apparatuses, methods, and systems for enhancing the recovery of hydrocarbon deposits.

In one exemplary embodiment, a method of enhancing the recovery of hydrocarbon deposits is provided. The method includes sensing a material property of an underground volume. The method also includes creating a three-dimensional map identifying the spatial variation in the sensed material property of the underground volume. The method further includes transmitting propagating electromagnetic radiation into the volume based on the map. The propagating electromagnetic radiation transmission is varied in at least one of frequency, polarization, wavelength, amplitude, mode, and phase in response to the variation in the material property of a region within the volume to which the propagating electromagnetic radiation is directed. Accordingly, the volume is heated by absorption of the propagating electromagnetic radiation in a spatially varying manner to induce the flow of hydrocarbon deposits from the volume.

Another exemplary embodiment provides an apparatus for enhancing recovery of hydrocarbon deposits. The apparatus includes a sensor configured to detect a material property of an underground volume. The apparatus also includes a transmitter configured to transmit propagating electromagnetic radiation into the volume and a controller electrically coupled to the sensor and the transmitter. The controller is configured to cause the transmitter to transmit propagating electromagnetic radiation into the volume, varying the radiation within the volume based on the spatial variation in the sensed material property in the volume.

Another exemplary embodiment provides a method of selectively heating a hydrocarbon deposit. The method includes generating, using a sensing device, a three-dimensional map of a material property of an underground volume. The method further includes heating a region within the volume with propagating electromagnetic radiation based on the map of the material property. The method also includes monitoring a change in a flow of the hydrocarbon deposits from the volume in response to the heating.

Another exemplary inventive embodiment provides a system for selective heating of a volume including a hydrocarbon deposit. The system includes a sensor configured to sense a material property of a material disposed in a volume including the hydrocarbon deposit and a processing device electrically coupled to the sensor. The processing device is configured to create a map showing the spatial variation in the sensed material property throughout the volume. The system also includes a transmitter electrically coupled to the processing device. The transmitter is configured to transmit propagating electromagnetic radiation into the volume to heat at least a portion of the volume based upon the map.

The invention is capable of other embodiments and of being carried out in various ways. Alternative exemplary embodiments relate to other features and combinations of features as may be generally recited in the claims.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

The skilled artisan will understand that the drawings primarily are for illustrative purposes and are not intended to limit the scope of the inventive subject matter described herein.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive systems, methods and apparatuses for enhancing recovery of hydrocarbon deposits in a variety of underground settings including, but not limited to an oil fields, regions including oil shale, tar sands, or areas of coal deposits. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Hydrocarbons (e.g. in the form of crude oil and natural gas) may be found in subsurface reservoirs or volumes. Electromagnetic waves may be utilized to sense various properties of hydrocarbons (e.g. subsurface or downhole hydrocarbons). The propagation of electromagnetic waves through a reservoir interacts with the hydrocarbons and surrounding materials (e.g., the propagated electromagnetic waves are reflected, absorbed, or transmitted, etc.). Incident electromagnetic waves are reflected, absorbed, or transmitted as a function of many factors, including the material the electromagnetic waves interact with, as different materials have different conductivity, electric permittivity, and magnetic permeability, among other properties affecting such waves. When electromagnetic waves are absorbed, energy is transferred to the absorbing material. These electromagnetic interactions may be sensed by a receiver in order to differentiate various properties of the material. For example, the sensed electromagnetic interactions may be used as inputs to calculate the density, temperature, composition, viscosity, and flow of the hydrocarbons, among other measurements. For additional discussion of the use of electromagnetic waves to determine properties of hydrocarbon materials, see, Nekut, A. G., and Spies, B. R., *Petroleum Exploration Using Controlled Source Electromagnetic Methods, Proc. IEEE, Vol.* 77, 338-362 (1989).

It is to be understood that while this application discusses the utilization of electromagnetic waves, the systems and methods disclosed herein are not limited to either near-field or propagating (far-field) electromagnetic waves. In the region close to a source, the corresponding electromagnetic field (the near-field) is dominated by electric and magnetic components produced directly by currents and charges within the source. However, at distances far from the material, the electromagnetic field (the far-field) becomes dominated by electric and magnetic components indirectly produced by the change in the other type of field.

In addition to utilizing electromagnetic waves, acoustics may be utilized to sense downhole hydrocarbon properties. Acoustic activity, which includes seismic or microseismic activity, may occur in a reservoir. The acoustic activity of hydrocarbons may occur passively, or as a result of active stimulation. As an example, passive acoustic activity can occur as hydrocarbon fluid (e.g., crude oil) shifts, or as material is removed from a reservoir. Acoustic activity may also be induced within the hydrocarbon material. For example, microseismic activity may be stimulated, or a seismic generator may generate the microseismic activity. Various acoustic sensing tools may be used to detect information related to such acoustic activity, however it occurs. The sensed acoustic information may be used to calculate various characteristics of the hydrocarbon material. These include, but are not limited to temperature, pressure, fracturing, fluid flow, such as density, porosity, viscosity, fluid composition, etc.

In some embodiments, sensing may be conducted by a first electromagnetic antenna. The first electromagnetic antenna may include a phased array. The first electromagnetic antenna may be configured to translate (e.g., along a drill shaft, etc.). The electromagnetic antenna may be configured to rotate. The electromagnetic antenna may be configured to transmit. In some embodiments sensing by the first electromagnetic antenna may include scanning the sensitivity pattern of the first electromagnetic antenna throughout the volume, in accordance with various embodiments. One embodiment includes transmitting propagating electromagnetic radiation in the form of microwaves. The microwaves may be generated through the use of one or more vacuum tubes.

In some embodiments the first electromagnetic antenna is positioned above ground. In some embodiments the first electromagnetic antenna is positioned underground and may be positioned underground in the volume. In various embodiments, the first electromagnetic antenna is positioned in a drill shaft.

In some embodiments transmitting includes transmission via a second electromagnetic antenna distinct from the first electromagnetic antenna, in accordance with some embodiments. The second electromagnetic antenna may be positioned above ground. The second electromagnetic antenna may be positioned underground and may be positioned underground in the volume. In some embodiments, the second electromagnetic antenna is configured to translate. In some embodiments, the second electromagnetic antenna is configured to rotate. The second electromagnetic antenna may include a phased array. In some embodiments, transmitting includes scanning a radiation pattern of the second electromagnetic antenna through the volume.

In some embodiments the second electromagnetic antenna is configured to translate along a drill shaft and may further be configured to rotate. The drill-shaft may include a non-metallic material. The drill-shaft may include a dielectric material. The drill-shaft may include a fiber-reinforced plastic-composite. The drill-shaft may be positioned in the volume. In some embodiments, the drill-shaft is positioned outside of the volume.

In some embodiments, sensing includes combining signals from a plurality of antennae. The plurality of antennae may be configured in a coherent array or in an incoherent array. In some embodiments sensing includes sensing electromagnetic radiation generated by microwave thermal emission from material disposed in the volume.

Some embodiments include transmitting propagating electromagnetic probe radiation into the volume and sensing includes sensing at least some of the interaction of the transmitted propagating electromagnetic probe radiation with a material disposed in the volume. Transmitting propagating electromagnetic probe radiation may include scanning the probe radiation through the volume. Sensing may includes sensing by a first electromagnetic antenna and transmitting may include transmitting propagating electromagnetic probe radiation by a second electromagnetic antenna. The second electromagnetic antenna translates, in accordance with some embodiments. The second electromagnetic antenna rotates, in accordance with some embodiments. The second electromagnetic antenna may include a phased array. The second electromagnetic antenna may be positioned above ground. Sensing may include scanning the first electromagnetic antenna in coordination with scanning of the probe radiation through the volume. Sensing may include sensing transmissions of the propagating electromagnetic probe radiation through the material disposed in the volume. In some embodiments, sensing includes sensing reflection of the propagating electromagnetic probe radiation through the material disposed in the volume. In some embodiments, sensing includes sensing diffraction of the propagating electromagnetic probe radiation through the material disposed in the volume. Sensing may include sensing emissions from selected spatial regions. Transmitting propagating electromagnetic radiation into the volume based on the map may include transmission via the second electromagnetic antenna and may include transmission via a third electromagnetic antenna.

In some embodiment, the sensor includes a multi-static sensor. In some embodiments, the sensor includes a monostatic sensor. In some embodiments, the sensor includes a bi-static sensor. The sensor may be an electromagnetic antenna or a directed antenna. In some embodiments, sensing includes sensing via an acoustic sensor. In some embodiments, sensing may include scanning the volume. In some embodiments, sensing may utilize sequentially scanned or fixed duration probe radiation. In some embodiment, sensing may utilize ground penetrating radar. The ground penetrating radar may be transmitted from an underground location and may be transmitted from above ground. In some embodiments, sensing includes utilization of a directed antenna. Sensed material properties may include one or more of temperature, viscosity, density, porosity, velocity, composition, and volatile quantity. In some embodiments, one or more components of the material are identified. The one or more components may include at least one of water, a hydrocarbon, and a host material. Some embodiments may include identifying a density of one or more components of the material. Some embodiments may include identifying a concentration of one or more components of the material. Some embodiments may include identifying relative proportions of two or more components of the material. For additional discussion of the sensing of volumetric underground material properties using probe radiation (RF and/or acoustic), see, U.S. Pat. No. 7,841,982 to Johnson et al., U.S. Pat. No. 6,216,090 to Hagiwara, and U.S. Pat. No. 5,892,732 to Gersztenkorn.

In various embodiments, a three-dimensional map identifying the spatial variation in sensed material property of the underground volume may be created. Some embodiments may include displaying on a display the three dimensional map identifying the spatial variation in the sensed material property of the underground volume. In such embodiments, sensing includes sensing from a region remote from the underground volume. Sensing may include sensing from above aground, in some embodiments. At least a portion of the sensor may be disposed in a region remote from the underground volume. At least a portion of the sensor may be disposed above ground. Transmitting propagating electromagnetic radiation may include transmitting from above ground, in accordance with some embodiments. Transmitting propagating electromagnetic radiation may include transmitting by a plurality of sources, in accordance with some embodiments. At least a portion of the transmitter may be disposed above ground. At least a portion of the transmitter may be disposed underground. A plurality of sources may be positioned to transmit propagating electromagnetic radiation in distinct directions. The plurality of sources may be disposed in an array, which array may include a phased array.

In some embodiments, transmitting propagating electromagnetic radiation includes transmitting propagating electromagnetic radiation in pulses. In some embodiments, the transmitter includes a pulsed source. In some embodiments, the transmitter includes a source propagating a steerable beam. The transmitter may include a rotating collimator. In accordance with some embodiments, transmissions of the probe radiation are detected. Detection includes detecting reflection of the probe radiation. Some embodiments may include detecting scattering of the probe radiation. Transmission of the propagating electromagnetic radiation includes transmitting such that the material property reaches a target value, in accordance with some embodiments. In various embodiments, transmitting of the propagating electromagnetic radiation includes transmitting such that the material property of the volume becomes substantially uniform. Transmitting may include transmitting of the propagating electromagnetic radiation includes transmitting such that the spatial variation in the sensed material property is reduced. Some embodiments may include transmitting probe audio waves into the volume and sensing further includes sensing interaction of the probe audio waves with a material disposed in the volume. For additional of volumetric sensing of underground material properties using acoustic probe beams with acoustic sensors, see, U.S. Pat. No. 8,038,616 to Angelsen et al.

Radiation may be varied by at least one of frequency, polarization, wavelength, amplitude, mode, and phase of the propagating electromagnetic radiation based on the spatial variation of the sensed material property in the volume. The variation in the propagating electromagnetic radiation transmitted may be completed in real-time in response to a sensed material property of a region within the volume. In accordance with some embodiments, transmission of the electromagnetic radiation into the volume may be controlled in real-time based on a map. The volume may include at least one of oil deposits, oil shale, tar sands, and coal deposits. In accordance with some embodiments, the map may be updated in response to transmission of electromagnetic radiation into the volume based on the map and initiating further transmission of propagating electromagnetic radiation into the volume in response to updating of the map, such that transmission of propagating electromagnetic radiation into the volume is achieved in a feedback control manner. In some embodiments, at least a portion of the volume may be heated using at least one of combustion, steam injection, and electricity. In some embodiments, a display may be included, which is configured to graphically depict the sensed material property within the volume. A three-dimensional map identifying the sensed material property within volume may be generated.

In some embodiments, a controller is configured to vary the polarization of the propagating electromagnetic radiation between vertical and horizontal electric fields. In some embodiments, a controller is configured to vary the polarization of the propagating electromagnetic radiation between left-hand and right-hand circularly polarized fields. The controller may further be configured to vary the polarization such that the mode structure of the electromagnetic field varies. The controller may be configured to vary the polarization such that coupling of electric fields of materials bordering the hydrocarbon deposits varies. The controller may also be configured to vary the propagating electromagnetic radiation transmitted in real-time in response to a sensed material property of a region within the volume.

Some embodiments may include a plurality of transmitters. The plurality of may be positioned to transmit propagating electromagnetic radiation in a plurality of directions. The plurality of transmitters may be disposed in an array. The plurality of transmitters may be disposed in a phased array.

In some embodiments, a sensor is configured to detect temperature (or other properties) via microwave thermometry. This also includes creating a volumetric map identifying the spatial distribution of the measured material property in the underground volume. Propagating electromagnetic radiation may be transmitted into the volume based on the volumetric map. Some embodiments may include identifying a material composition of the material disposed in the subterranean volume using microwave emission spectroscopy.

Some embodiments may include an auxiliary heat source providing at least one of combustion heating, steam injection heating, and electrical heating. Heating may include simultaneously heating a plurality of regions within the volume based on the map of the material property.

Figure 1A:
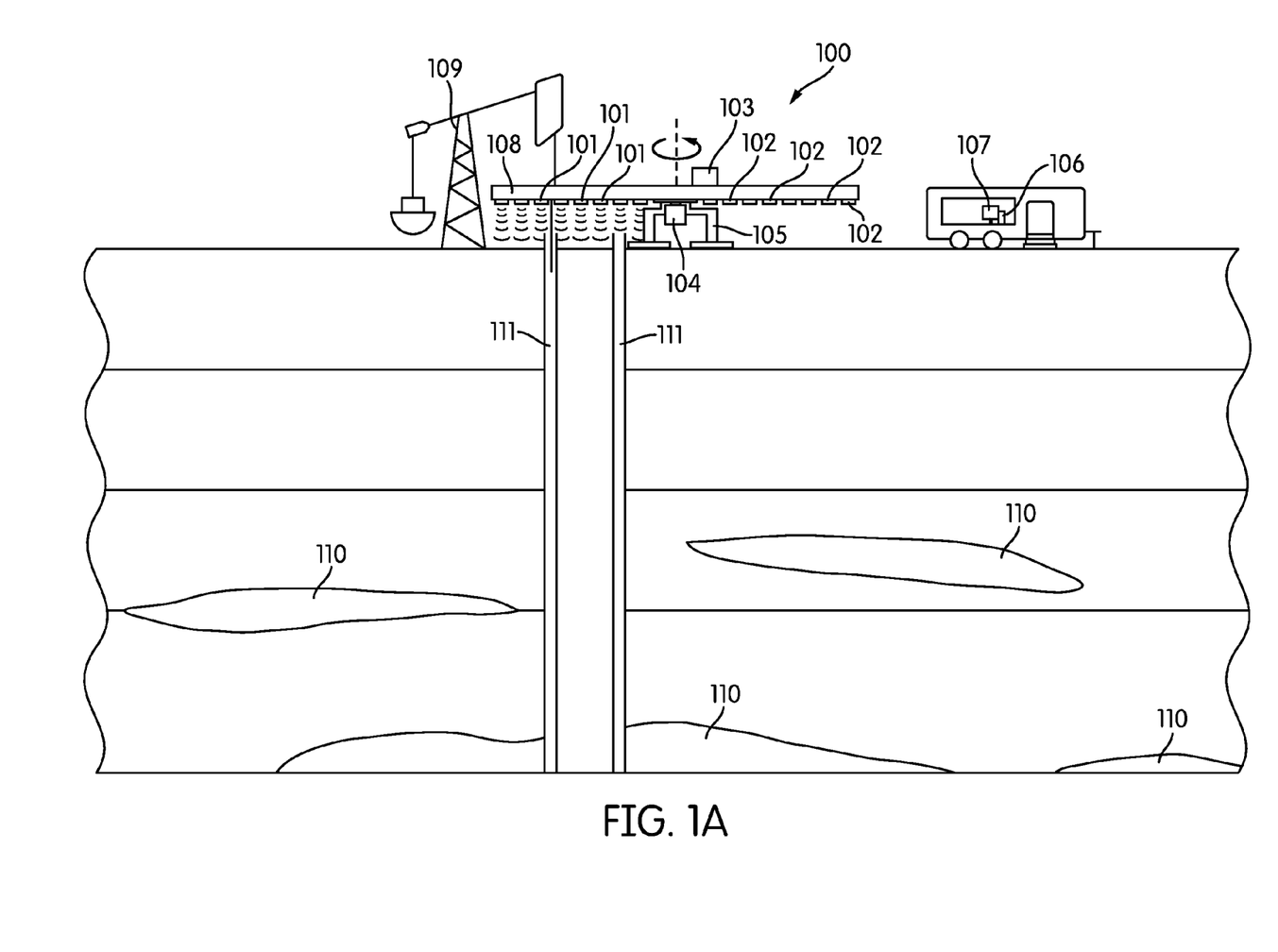
FIGS. 1A and 1B illustrate an exemplary inventive embodiment of mappable underground heating system.
Figure 1B:
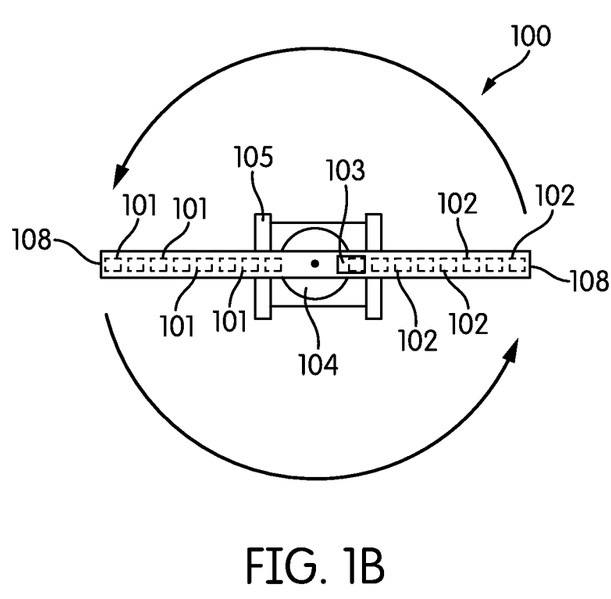

FIGS. 1A and 1B illustrate an exemplary inventive embodiment of a mappable underground heating system. FIG. 1A provides a side view of rotating mappable underground heating system 100, while FIG. 1B provides a top view of the system 100. Heating system 100 is designed for use above ground during both the mapping and the heating phases. In the illustrated embodiment, the system includes an arm 108 that rotates on base 105 via rotary motor 104. The arm is depicted in FIGS. 1A and 1B with an array of mapping sensors 101 disposed on one side of the arm and with an array of transmitters 102 disposed on the opposite side of the arm. The array of transmitters may be directional transmitters and may be positioned in the same direction or distinct directions with respect to one another. Through rotation of arm 108 a circular area may be mapped using sensors 102 to detect one or more material characteristics. The sensitivity of sensor 102 may be adjusted to sense the properties of the ground at various depths. Accordingly, through one or more rotations of arm 108, cylindrical volume may be characterized based on the particular property analyzed. For example, if sensors 102 measure temperature, each sensor can take a reading at various degrees of rotation of the arm for a first depth until an entire circular area is characterized. The sensing depth may be subsequently altered in order to generate data suitable for mapping a temperature profile of a cylindrical volume beneath system 100. Once the profile is created, a series of subsequent rotations may be made by arm 108 to perform heating of the volume in a similar manner. The heating may be varied based on the profile of existing temperatures with the volume and or based on other material properties which may reveal areas of higher oil concentrations, which may warrant additional or increased levels of heating in order to boost the yield and efficiency.

Sensors 101 may include a variety of sensor types. The sensors may be electromagnetic antennas sending out signals and measuring the response to the same. Transmitters 102 may include sources configured to produce propagating electromagnetic radiation in the microwave frequencies, which frequencies may be generated by vacuum tubes disposed within system 100. Transmitters 102 may also be coupled to a controller 103, which may include a processing device, such as a microprocessor, operable to vary parameters of the propagating electromagnetic radiation transmitted by the transmitters, which parameters may include frequency, polarization, wavelength, amplitude, mode, and phase. Each of these parameters may be varied in order to achieve the desired non-uniform heating of the underground volume. System 100 may be structured to reside directly above a drilling location, such that the heated volume will induce flow into an existing oil well or drilling structure.

In some embodiments, sensors may be configured to detect microwave electromagnetic radiation emitted from a downhole deposit of hydrocarbon material. The magnitude of the detected microwave electromagnetic radiation is dependent on the properties (e.g., temperature, distance, microwave absorption, etc.) of the materials emitting the electromagnetic radiation. These properties in conjunction with the detected microwave radiation may be used via microwave thermometry to calculate temperature distributions throughout the downhole deposit. Microwave thermometry may be used in biological applications to determine volumetric temperature distributions inside a remote volume. For additional discussion of these techniques, see, Mizushina, et al., *Retrieval of Temperature-Depth Profiles in Biological Objects from Multi-Frequency Microwave Radiometric Data*, Journal of Electromagnetic Waves and Applications, Vol. 7, 1515-1548 (1993); and see, Hand, et al., *Monitoring of Deep Brain Temperature in Infants Using Multi-Frequency Microwave Radiometry and Thermal Modeling*, Physics in Medicine and Biology, Vol. 46, 1885-1903 (2001).

In some embodiments, sensors are configured to detect microwave emissions for use with emission spectroscopy functions. An emission spectrum of a material corresponds to the spectrum of frequencies of electromagnetic radiation emitted by the elements within a material. These emissions may be detected by a sensor, and spectroscopic techniques may be applied to identify the components of the material, as the emission spectrum of a particular element is unique. In this fashion the electromagnetic antennae may configured to detect microwave emissions emitted from a downhole volume of hydrocarbon material. Detected microwave emission data may then be used to analyze the materials and elements within the downhole volume.

In some embodiments, sensors are configured to provide data for compressive imaging purposes. Compressive imaging involves using a comparatively small number of projections of a compressible image to reconstruct or process large image data. The projections of compressible images contain information that may be decompressed and used for image processing or image reconstruction. In this manner, the electromagnetic antennae may be used to detect electromagnetic signals that are propagated into downhole volumes of hydrocarbon material. These detected signals are then converted to any of a number of intermediate, "condensed" representations which may then be used for processing (e.g., constructing a high resolution three dimensional map, etc.).

In some embodiments, system 100 may be electrically coupled, wired or wirelessly, to a remote computing device 106 and a display device 107 for analysis, storage, image generation, and database generation of the mapping and heating. For example, display device 107 may generate a tomographic image of the mapped property before, during and after recovery of hydrocarbon deposits, including oil deposits from the mapped and heated volume. The array of transmitters 102 may be simultaneously activated in accordance with various embodiments or they may be sequentially or individually activated. While FIGS. 1A and 1B demonstrate arms 108 of heating and mapping system 100 as linear, the arms may be shaped as desired to optimize the mapping and heating of system 100.

Figure 2:
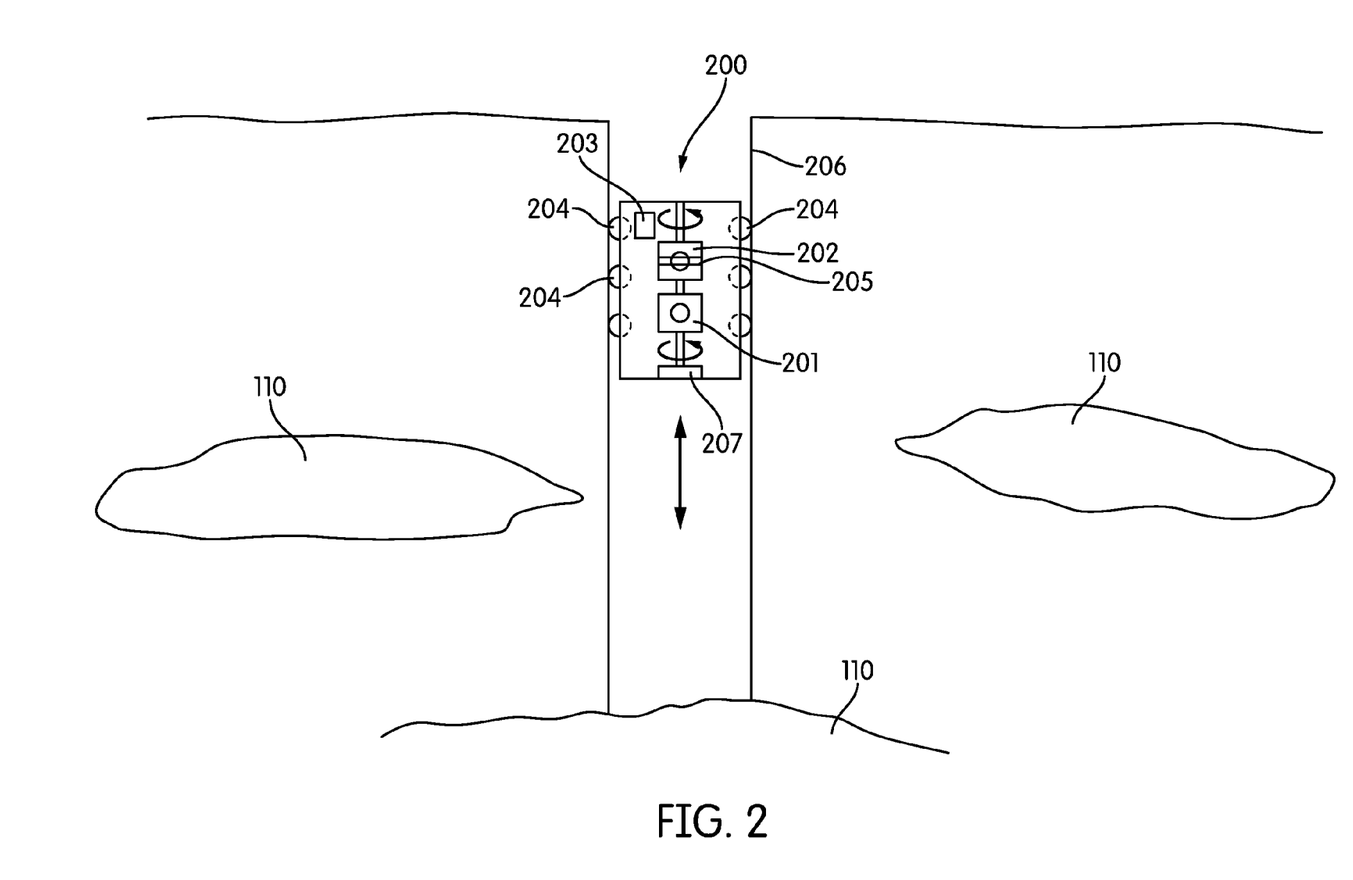
FIG. 2 illustrates a mappable heating system operable underground in accordance with exemplary inventive embodiments.

FIG. 2 illustrates a mappable heating system operable underground in accordance with exemplary inventive embodiments. System 200 provides a down-hole heating and mapping system, which unlike the remotely located system shown in FIGS. 1A and 1B, is designed to heat a volume from a local position. System 100 includes a shuttle or body 206 which is translatable within an existing drill shaft 207. Shaft 207 may be composed of a non-metallic material including, but not limited to, a dielectric material and a fiber-reinforced plastic composite. System 200 may include one or more sensors 201 and transmitters 202 which provide detection and heating properties similar to those described in connection with sensors 101 and transmitters 102. Sensors 201 and transmitters 202 may be rotatable within the shuttle body in accordance with various inventive embodiments. However, sensors 201 and transmitters 202 may be stationary in some embodiments and system 200 may include a collimator or another steering mechanism for directing transmission and receipt of signals and radiation transmitted from sensors 201 and transmitters 202. System 200 may include wheels 204 or a tracking mechanism to allow the system to translate within drill shaft 207. The system may be implemented to map and heat a cylindrical volume in accordance with various inventive embodiments.

Figure 3A:
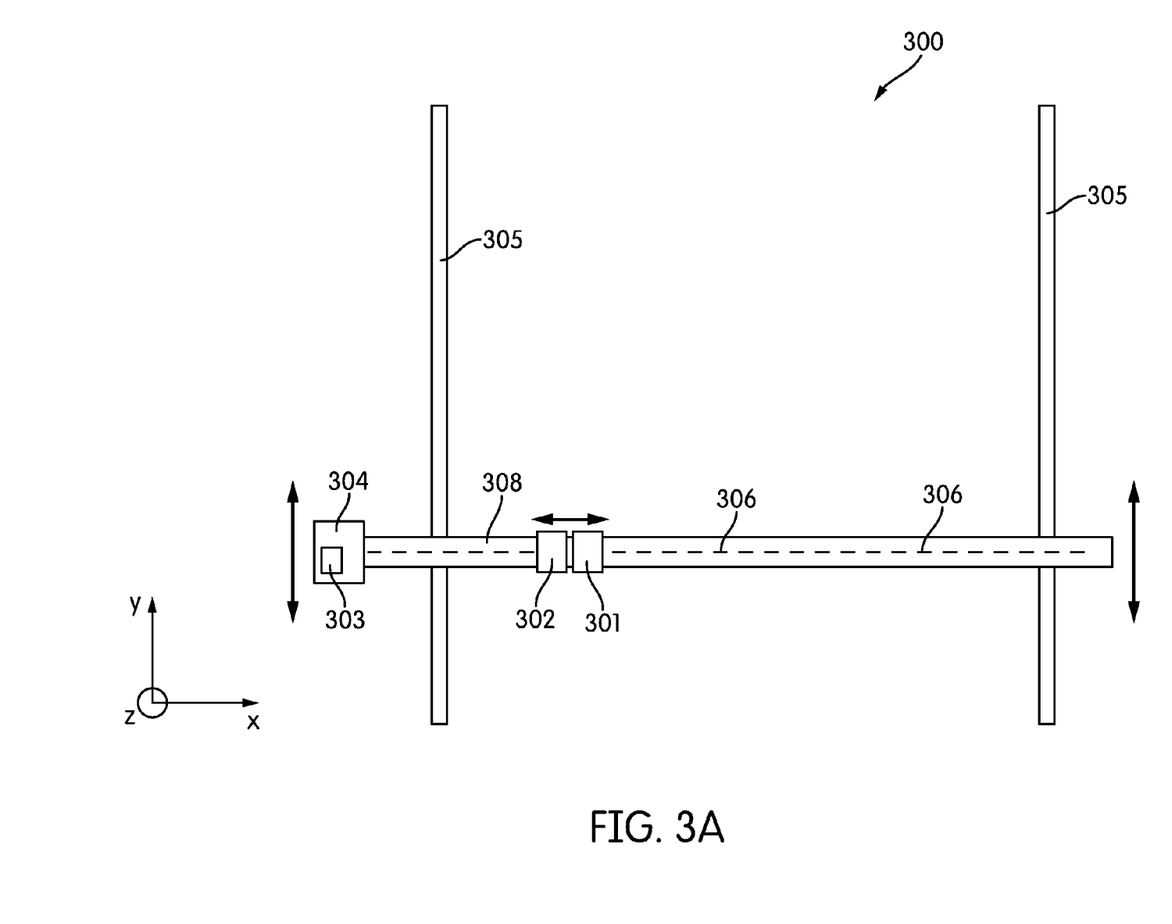
FIGS. 3A and 3B illustrate another mappable underground heating system in accordance with exemplary inventive embodiments.
Figure 3B:
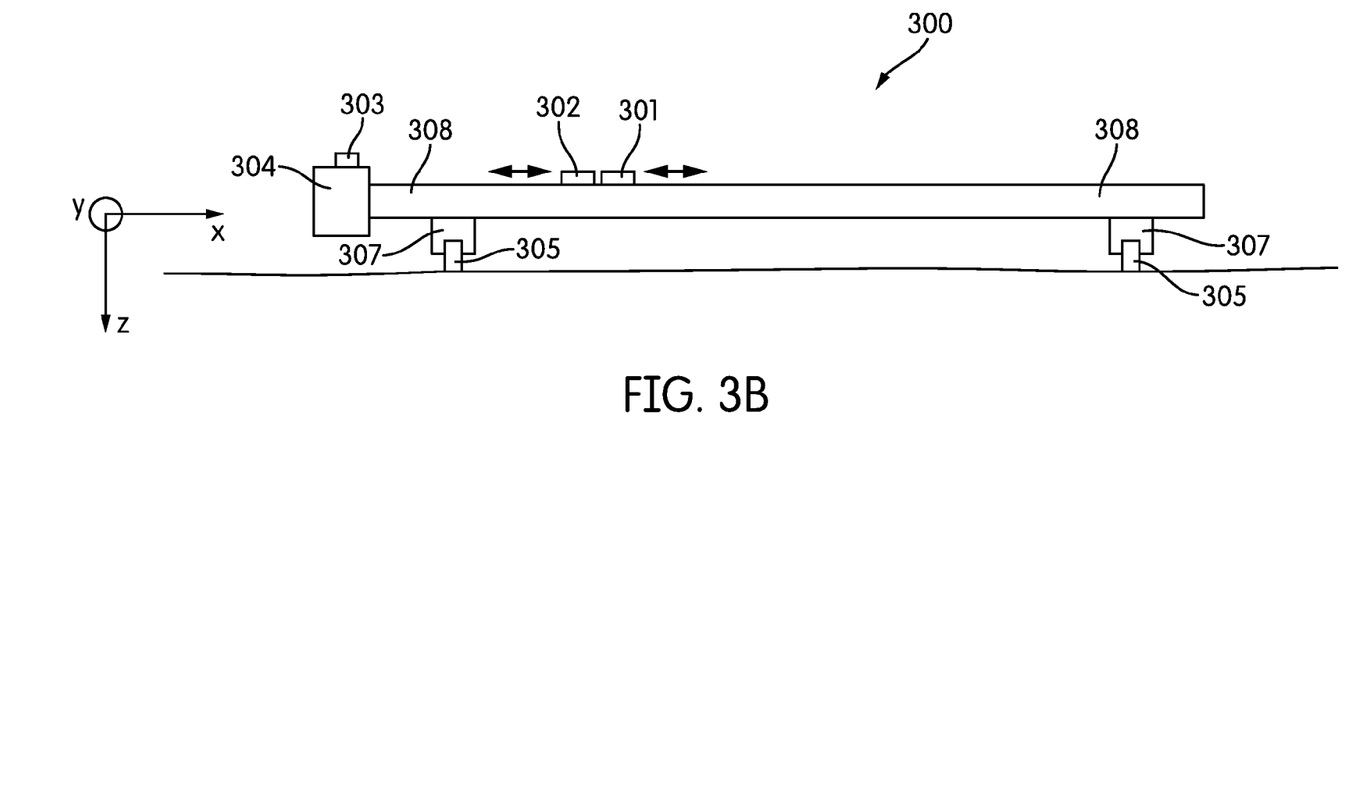

FIGS. 3A and 3B illustrate another mappable underground heating system in accordance with exemplary inventive embodiments. System 300 in a manner similar to system 100 is designed for remote mapping and heating. System 300 allows cubic volumes or variations on the same to be mapped and heated in accordance with various inventive embodiments. FIG. 3A provides a top view of system 300, while FIG. 3B provides a side view of the system. As demonstrated in FIGS. 3A and 3B, system 300 includes a translatable arm 308, which includes transmitter 302 and sensor 301. Arm 308 may include a plurality of transmitters 302 and sensors 301 in accordance with various embodiments. Similarly, in some embodiments, a single antenna may be used to transmit a signal for sensing and for heating. Arm 308 is configured to move or slide along a y-axis via tracks 305 and may include a set of bearings 307 in connection with the longitudinal motion. Transmitter 302 and sensor 301 may similarly move along track 306 for lateral movement along an x-axis. Accordingly, a rectangular area may be mapped and heated and the depth of the mapping and heating may be varied to map and heat a cubic volume. Arm 308 may include a power supply 304 and a controller 303 disposed therein to provide electromagnetic energy for transmitter 302 and to control the heating variation of the same. In various embodiments, transmitter 302 and sensor 301 may be operated from a location remote from system 300. Sensors 301 may be configured for multi-static, mono-static or bi-static sensing. Sensor 301 may be an acoustic sensor and may be configured to sense material properties including, but not limited to, temperature, density, porosity, and velocity.

While FIGS. 1A-3B depict various inventive embodiments that include dynamic antenna or antennae configured for at least one of sensing and heating a volume through one or more of linear and rotary motion, various inventive embodiments may include a fixed antenna or fixed antennae for at least one of sensing the variation in the material property of a volume or a portion thereof and heating at least a portion of the volume based on spatial variation in a material property. The antennae may be configured in an array in accordance with some inventive embodiments, and may constitute a phased array. The fixed antenna or antennae may be configured to transmit propagating radiation, such as probe radiation via electronic steering of the radiation. For example the antenna or antennae may include one or more scanners such as an electromagnetic steering device, a mechanical steering device, such as a shield or other scanning systems to direct the transmission of electromagnetic radiation transmitted by one or more antenna, for example to scan a volume or to heat an identified portion or the entirety of a scanned volume. Some inventive embodiments may include a combination of dynamic and fixed antennae.

In some embodiments, mapping functions include utilization of an electromagnetic antennae for tomographic imaging. The electromagnetic antennae may be used to detect electromagnetic signals that are propagated into layers of a downhole volume of hydrocarbon material. Detected signals corresponding to the different layers may be imaged as tomographic image slices, in a fashion similar to that used in CAT scans. The tomographic image slices may then be reconstructed using volumetric imaging algorithms. By reconstructing the tomographic image slices in this manner, a three dimensional map representing a downhole volume of hydrocarbon material may be created. The image slices may represent horizontal planes, vertical planes, or be at other inclinations. In other embodiments, tomography may not be performed on a slice by slice basis, but can utilize a 3D collection of beam directions, and a 3D image can be processed using a direct volumetric inversion algorithm. Additional discussion of using RF tomography for mapping underground material properties is provided in U.S. Pat. No. 4,755,944 to Glass.

Figure 4:
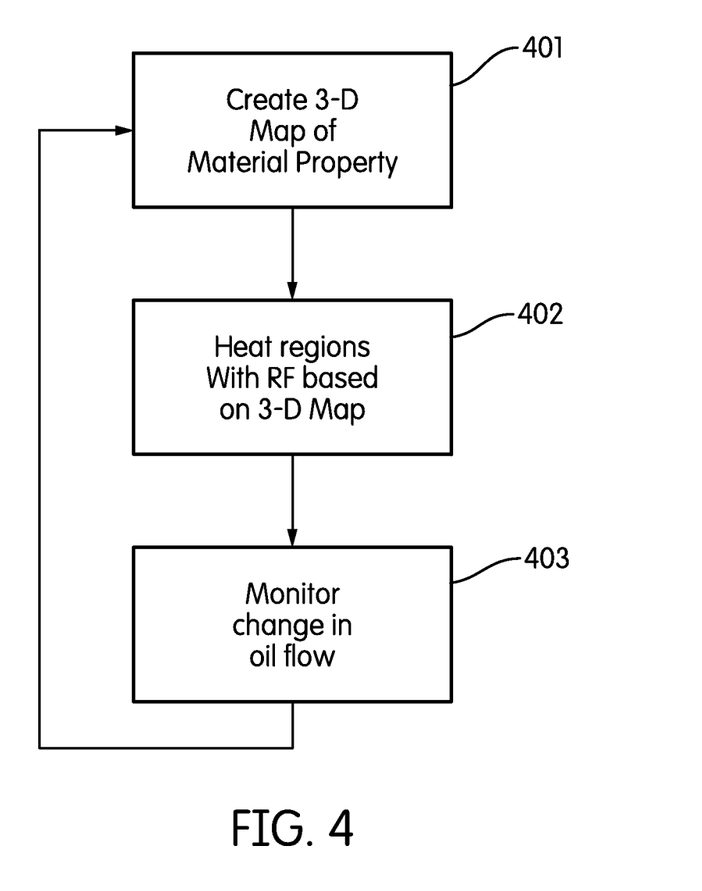
FIG. 4 provides a flow chart heating and mapping process implemented by various exemplary inventive embodiments.

FIG. 4 provides a flow chart of a heating and mapping process implemented by various exemplary inventive embodiments. In accordance with various inventive embodiments, the underground heating and mapping system provided herein may be implemented in a real-time feedback control mode. Accordingly, as a volume is being mapped in step 401, regions within the volume may be heated in step 402. Changes in the flow of hydrocarbons deposited within the volume may be monitored in step 403 as the volume is heated and the area may be remapped to reflect the changes in the material properties due to the heating and induced or enhanced flow and the heating may be subsequently adjusted to increase, decrease, or redirect the region of heating provided in step 402. Monitoring in step 403 may be achieved via one or more sensors disposed in the drill shaft, or in an annulus or a pipe disposed in the same. Monitoring in step 403 may be completed via one or more sensors disposed in a port or pump disposed down hole or above ground. Alternatively, the sensors implemented for mapping may also be used to monitoring in step 403.

Figure 5:
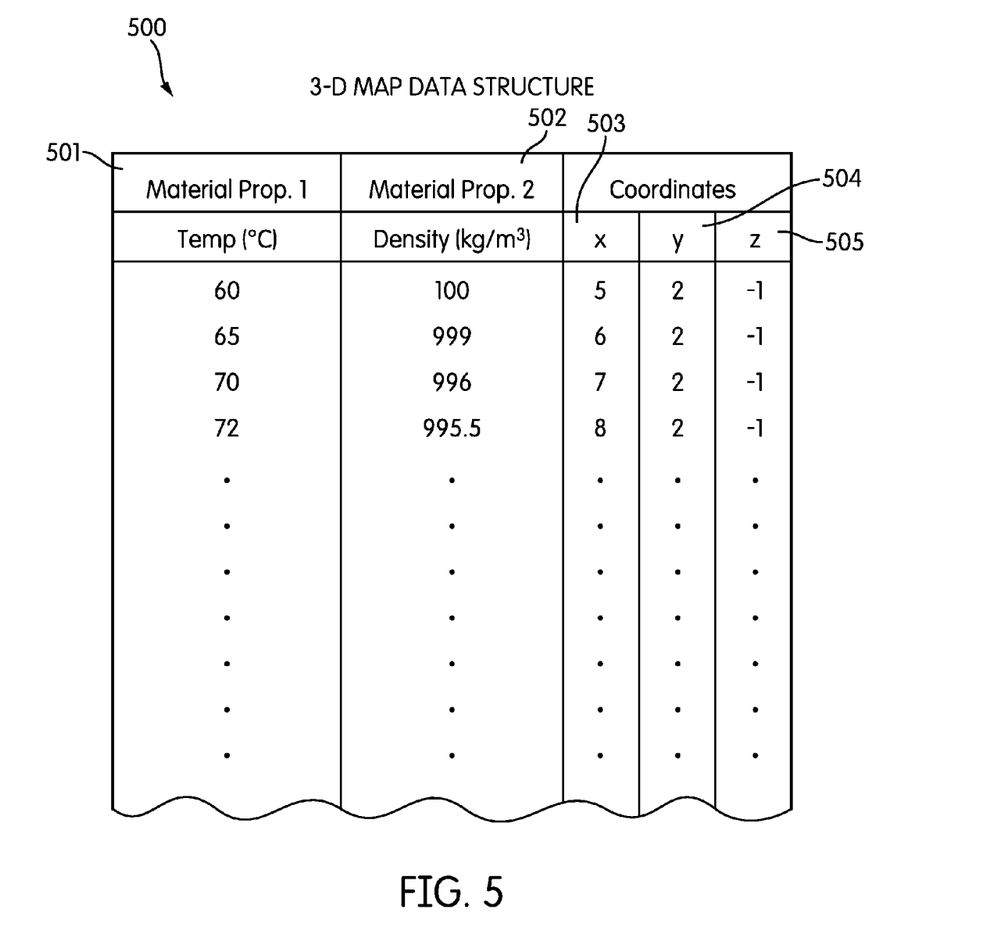
FIG. 5 illustrates a table providing mapping information for heating an underground volume in accordance with various exemplary inventive embodiments.

FIG. 5 illustrates a table providing mapping information for heating an underground volume in accordance with various exemplary inventive embodiments. In some embodiments a three-dimensional map may be generated in a tabular format as shown in FIG. 5. This data table 500 may be represented by a graphic display in various inventive embodiments and may be updated in real-time to reflect changes due to changes in heating and flow conditions. As demonstrated by the exemplary table 500, one or more material properties may be sensed. Column 1 lists the temperature of a particular location corresponding to the x-coordinate listed in column 503, y-coordinate in column 504, and z-coordinate in column 505. A second material property, such as density, may be identified for the same location as depicted by the sample densities provided in column 502. Accordingly, the material properties of an entire volume may be detected and used to provide direction for heating of the volume.

While various inventive embodiments have been described and illustrated herein, those of ordinary skill in the art will envision a variety of other structures for performing the function or obtaining the results or one or more of the advantages described herein, and each of such variations or modifications is deemed to be within the scope of the inventive embodiments described herein. More generally, those skilled in the art will appreciate that all parameters, dimensions, materials, and configurations described herein are meant to be exemplary and that the actual parameters, dimensions, materials, and configurations will depend upon the specific application or applications for which the inventive teachings are used. Those skilled in the art will recognize equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and method described herein. In addition, any combination of two or more such features, systems, articles, materials, kits, and methods, if such features, systems, articles, materials, kits, and methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method of enhancing recovery of hydrocarbon deposits, the method comprising:
   sensing a material property of an underground volume by a first electromagnetic antenna positioned above ground and remote from the volume;
   creating a three dimensional map identifying the spatial variation in the sensed material property of the underground volume; and
   transmitting propagating electromagnetic radiation into the volume based on the three dimensional map, the propagating electromagnetic radiation transmission varying in at least one of frequency, polarization, wavelength, amplitude, mode or phase in response to the variation in the material property of a region within the volume to which the propagating electromagnetic radiation is directed, wherein the propagating electromagnetic radiation is transmitted in a spatially varying manner to heat material in the volume and thereby induce the flow of hydrocarbon deposits from the volume, wherein transmitting includes transmission via a second electromagnetic antenna positioned above ground and remote from the volume.

2. The method of claim 1, wherein the first electromagnetic antenna includes a phased array.

3. The method of claim 1, wherein sensing includes scanning a sensitivity pattern of the first electromagnetic antenna throughout the volume.

4. The method of claim 1, wherein the second electromagnetic antenna is distinct from the first electromagnetic antenna, wherein the first electromagnetic antenna is configured to sense the material property of the volume through a linear motion, and wherein the second electromagnetic antenna is configured to heat the volume through a linear motion.

5. The method of claim 1, further comprising transmitting propagating electromagnetic probe radiation into the volume and wherein sensing includes sensing at least some of the interaction of the transmitted propagating electromagnetic probe radiation with a material disposed in the volume.

6. The method of claim 5, wherein sensing includes sensing by a first electromagnetic antenna and transmitting includes transmitting propagating electromagnetic probe radiation by a second electromagnetic antenna.

7. The method of claim 1, wherein transmitting propagating electromagnetic radiation includes transmitting by a plurality of sources.

8. The method of claim 1, wherein creating the three dimensional map includes utilization of the first electromagnetic antennae for compressive imaging.

9. The method of claim 1, further comprising:
   updating the three dimensional map in response to transmission of electromagnetic radiation into the volume based on the three dimensional map; and
   initiating further transmission of propagating electromagnetic radiation into the volume in response to updating of the three dimensional map, such that transmission of propagating electromagnetic radiation into the volume is achieved in a feedback control manner.

10. The method of claim 1, further comprising varying a polarization of the propagating electromagnetic radiation between vertical and horizontal electric fields.

11. The method of claim 1, further comprising heating at least a portion of the volume using an auxiliary heat source providing at least one of combustion, steam injection, and electricity.

12. The method of claim 1, further comprising transmitting probe audio waves into the volume and wherein sensing includes sensing interaction of the probe audio waves with a material disposed in the volume.

13. An apparatus for enhancing recovery of hydrocarbon deposits, the apparatus comprising:

a sensor configured to detect a spatial variation of a material property of an underground volume using a first electromagnetic antenna positioned above ground and remote from the volume;

a transmitter configured to transmit propagating electromagnetic radiation into the volume to heat material disposed in the volume using a second electromagnetic antenna positioned above ground and remote from the volume; and a controller electrically coupled to the sensor and the transmitter, the controller configured to cause the transmitter to transmit propagating electromagnetic radiation into the volume wherein the radiation is varied within the volume based on the spatial variation of the sensed material property in the volume.

14. The apparatus of claim 13, wherein the radiation is varied by at least one of frequency, polarization, wavelength, amplitude, mode, or phase based on the spatial variation of the sensed material property in the volume.

15. The apparatus of claim 13, wherein the first electromagnetic antenna is configured to sense the material property of the volume through a rotary motion, and wherein the second electromagnetic antenna is configured to heat the volume through a rotary motion.

16. The apparatus of claim 13, wherein the transmitter includes the first electromagnetic antenna.

17. The apparatus of claim 15, wherein the transmitter includes a second electromagnetic antenna at least partially distinct from the first electromagnetic antenna.

18. The apparatus of claim 13, further comprising a display configured to depict the spatial variation in the sensed material property within the volume.

19. The apparatus of claim 13, further comprising a plurality of transmitters.

20. The apparatus of claim 19, wherein the plurality of transmitters are disposed in an array.

21. The apparatus of claim 13, wherein the sensor is configured to transmit probe radiation.

22. The apparatus of claim 21, further comprising a sensor configured to detect transmission of the probe radiation.

23. The apparatus of claim 21, further comprising a sensor configured to detect reflection of the probe radiation.

24. The apparatus of claim 13, wherein the controller is configured to cause transmission of propagating electromagnetic radiation until the material property of the volume is made substantially uniform.

25. The apparatus of claim 13, wherein the transmitter is configured to vary a polarization of the propagating electromagnetic radiation between vertical and horizontal electric fields.

26. The apparatus of claim 13, further comprising an auxiliary heat source configured to heat material disposed in the volume using at least one of combustion heating, steam injection heating, and electrical heating.

27. The apparatus of claim 13, wherein the controller is further configured to vary the propagating electromagnetic radiation transmitted in real-time in response to a sensed material property of a region within the volume.

28. A system for selective heating of a volume including a hydrocarbon deposit, the system comprising:

a sensor configured to sense a material property of a material disposed in a volume including the hydrocarbon deposit using a first electromagnetic antenna positioned above ground and remote from the volume;

a processing device electrically coupled to the sensor, the processing device configured to create a three dimensional map using volumetric imaging algorithms to show the spatial variation in the sensed material property throughout the volume; and a transmitter electrically coupled to the processing device, the transmitter configured to transmit propagating electromagnetic radiation into the volume to heat at least a portion of the volume based upon the three dimensional map, wherein the transmitter transmits the propagating electromagnetic radiation using a second electromagnetic antenna positioned above ground and remote from the volume.

29. The system of claim 28, further comprising an antenna configured to transmit a probe electromagnetic signal into the hydrocarbon deposit.

30. The system of claim 29, wherein the sensor is configured to detect an interaction of the probe electromagnetic signal with the material disposed in the volume.

31. The system of claim 28, wherein the transmitter is configured to transmit microwaves.

32. The system of claim 28, further comprising a display configured to depict the spatial variation in the sensed material property within the volume.

33. The system of claim 28, further comprising a plurality of transmitters.

34. The system of claim 33, wherein the plurality of transmitters are positioned to transmit propagating electromagnetic radiation in a plurality of directions.

35. The system of claim 28, wherein the sensor is configured to transmit probe radiation.

36. The system of claim 35, further comprising a sensor configured to detect transmission of the probe radiation.

37. The system of claim 28, wherein the sensor includes a source of ground penetrating radar.

38. The system of claim 37, wherein the ground penetrating radar source is disposed above ground.

39. The system of claim 28, wherein the processing device is further configured to cause transmission of propagating electromagnetic radiation until the material property of the volume is made substantially uniform.

40. The system of claim 28, further comprising an auxiliary heat source providing at least one of combustion heating, steam injection heating, and electrical heating.

41. The system of claim 28, wherein the processing device is further configured to vary the propagating electromagnetic radiation transmitted in real-time in response to a sensed material property of a region within the volume.

* * * * *